(12) United States Patent
Todd et al.

(10) Patent No.: US 9,647,844 B2
(45) Date of Patent: May 9, 2017

(54) GOVERNED PLACEMENT OF DATA ANALYTIC RESULTS

(71) Applicant: EMC Corporation, Hopkinton, MA (US)

(72) Inventors: Stephen Todd, Shrewsbury, MA (US); Said Tabet, Natick (MA)

(73) Assignee: EMC IP Holding Company LLC, Hopkinton, MA (US)

( * ) Notice: Subject to any disclaimer, the term of this patent is extended or adjusted under 35 U.S.C. 154(b) by 144 days.

(21) Appl. No.: 14/744,921

(22) Filed: Jun. 19, 2015

(65) Prior Publication Data

US 2016/0371396 A1 Dec. 22, 2016

(51) Int. Cl.
*H04L 9/00* (2006.01)
*H04L 9/32* (2006.01)
*G06F 17/30* (2006.01)

(52) U.S. Cl.
CPC ...... *H04L 9/3247* (2013.01); *G06F 17/30309* (2013.01)

(58) Field of Classification Search
CPC ............ G06F 17/3033; G06F 17/3097; G06F 17/30997; G06F 17/30991; H04L 9/3247
See application file for complete search history.

(56) References Cited

U.S. PATENT DOCUMENTS

2005/0108703 A1* 5/2005 Hellier ................. G06F 8/64
717/174
2011/0231899 A1 9/2011 Pulier et al.

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.
U.S. Appl. No. 14/674,121 filed in the name of Stephen Todd et al. Mar. 31, 2015 and entitled "Lineage-Based Veracity for Data Repositories."
U.S. Appl. No. 14/610,191 filed in the name of Stephen Todd et al. Jan. 30, 2015 and entitled "Governed Application Deployment on Trusted Infrastructure."
U.S. Appl. No. 14/744,886 filed in the name of Stephen Todd et al. Jun. 19, 2015 and entitled "Infrastructure Trust Index."

* cited by examiner

*Primary Examiner* — Beemnet Dada
(74) *Attorney, Agent, or Firm* — Ryan, Mason & Lewis, LLP (57) ABSTRACT

Metadata respectively associated with one or more input data sets processed by one or more analytic applications is obtained. The metadata for each data set is indicative of at least one of trust and veracity associated with the data set. The one or more analytic applications generate analytic results based on the one or more input data sets. A governed placement is determined for at least the analytic results based on at least a portion of the obtained metadata.

20 Claims, 5 Drawing Sheets

GOVERNED PLACEMENT OF DATA ANALYTIC RESULTS

FIELD

The field relates generally to data analytics, and more particularly to managing data analytic results.

BACKGROUND

Data analytics typically refers to the science that incorporates various disciplines including, but not limited to, data engineering, mathematics, statistics, computing, and domain-specific expertise. Thus, a data scientist or a data engineer is one who practices some or all aspects of data analytics in attempting to solve complex data problems involving one or more input data sets.

Data scientists or data engineers employ one or more analytic algorithms that typically explore the input data sets and/or aggregate the input data sets (when multiple data sets are involved), and then generate one or more output data sets which represent the analytic output or results of the one or more analytic algorithms. Such analytic results typically get placed in an analytic sandbox or a data lake for further action. An analytic sandbox is a separate computing environment used to condition and/or further experiment with the data, while a data lake is a centralized data storage system for structured and unstructured data.

However, whether the analytic results are placed in an analytic sandbox, a data lake, or some other storage location, such data placements are typically highly ungoverned.

SUMMARY

Embodiments of the invention provide techniques for managing data analytic results.

For example, in one embodiment, a method comprises the following steps. Metadata respectively associated with one or more input data sets processed by one or more analytic applications is obtained. The metadata for each data set is indicative of at least one of trust and veracity associated with the data set. The one or more analytic applications generate analytic results based on the one or more input data sets. A governed placement is determined for at least the analytic results based on at least a portion of the obtained metadata. A governance selector input (e.g., max, average, median, mode, override modes) may also be used to make the placement determination.

Advantageously, illustrative embodiments eliminate the ungoverned placement of analytic results by providing dynamic, trusted placement, thus enabling data scientists and data engineers to maintain compliance with trust and veracity requirements/preferences associated with the data sets from which the results are derived.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" refers to one or more software programs designed to perform one or more functions; "infrastructure" refers to physical and/or virtual resources that make up and/or support an overall information technology environment including, but not limited to, computing, storage, and/or network components (elements); "metadata" refers to data that describes or defines other data; and "trusted" refers to at least one of: satisfying (or at least substantially satisfying) or being consistent with one or more trust-based criteria, e.g., policies, requirements, regulations, etc.; possessing one or more trust attributes such as, e.g., retention-capable, encryption, immutability, etc., in the case of data; and possessing one or more trust dimensions such as, e.g., availability, recovery, security, etc., in the case of infrastructure. An example of metadata representing trust that is generated and used in accordance with embodiments of the invention includes an infrastructure trust index (ITI), as will be explained in detail herein. The ITI may also be referred to herein as an ITI metric, ITI score, ITI value, or the like. Other examples of metadata may include, but are not limited to, trust metrics, veracity scores, trust attributes, and/or associations between trust characteristics and data entities. Overall, such examples of metadata are considered to be indicative of the trust and/or the veracity of a given data set.

As mentioned above with regard to existing approaches to analytic results generated in accordance with analytic algorithms employed by data scientists/data engineers, whether the analytic results are placed in an analytic sandbox, a data lake, or any place else, such data placements are highly ungoverned. That is, the data scientists or data engineers employing the analytics algorithms are focusing on exploration and experimentation, with little concern (if any) for regulatory requirements, corporate policy, and/or even personal choice as to the placement of their output/results. Further, issues of security and privacy are rarely considered in such existing situations. As a result, the creation of analytic results and/or the placement of resulting data sets can, at a minimum, violate corporate policies and, in a worst-case scenario, violate national or international law.

For example, consider the following illustrative scenarios where ungoverned analytics results can present problems. Assume that mortgage documents currently being retained for many years are used as input to an analysis engine that produces a report that also, in turn, is required to be immediately (without the chance of modification) retained for a prescribed number of years, possibly in multiple copies. Failure to retain the report in an unaltered state in a data storage system for the prescribed number of years can violate various governmental regulations in the United States as well as in other countries. By way of further example, assume a financial company in Singapore ships a data set to the United States for analysis along with an American-based data set (e.g., mortgage-backed securities, derivatives, etc.). As per Singapore law, the output of the analysis must not be stored in cleartext form outside of the country of Singapore. Failure to consider these requirements with respect to the aggregated data sets thus runs afoul of national laws.

Illustrative embodiments provide techniques which address the above and many other scenarios by leveraging veracity, trust data, and, if available, provenance to govern the placement of analytic output onto an appropriate infrastructure in a way that is auditable and provable.

For example, as will be illustrated below, a given list of input data sets A...N is accompanied by statements of veracity as to their reliability. This veracity information enables proper analytic output placement.

Further, by way of example, input data sets are accompanied by statements describing the level of trusted infrastructure on which those data sets reside. This is true for either: (a) data sets that have undergone ELT into a data lake; or (b) data sets that currently reside in a data lake that may have different pockets of trusted infrastructure therein. This enables the ability to constrain placement of analytic output based on an understanding of the value of the data (e.g., in terms of level of investment of the trusted infrastructure for that data).

Still further, it is realized that programmers often write their analytic code by haphazardly piping output to whatever location is available in their analytic sandbox and/or data lake. Even if these programmers were to have visibility into veracity or trust metadata on input data sets, there is no existing programming framework for ensuring proper output targeting. They also lack knowledge and expertise in data governance and related compliance and risk management (GRC) needs. Illustrative embodiments provide such a framework that ensures proper output targeting, and that has knowledge and expertise that addresses GRC needs.

Even if programmers were able to correctly place analytic output onto a compliant and trusted data store, and then provide this output to a regulator, there is no existing method for programmatically preserving the evidence of that placement in the case of a subsequent audit. Illustrative embodiments provide such a preservation methodology.

Figure 1:
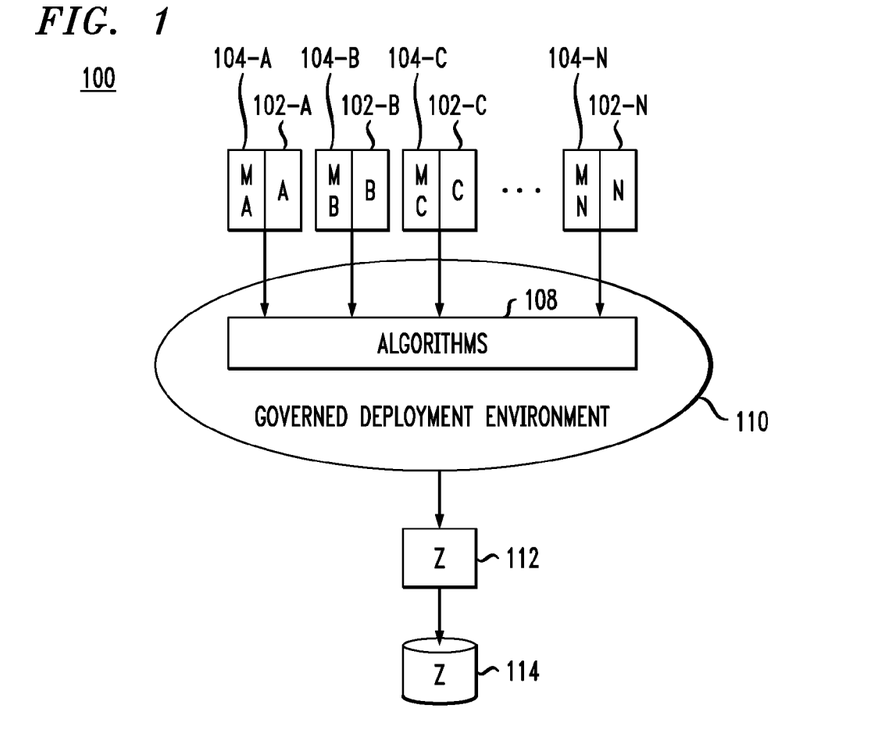
FIG. 1 illustrates a system for governed data analytic results placement, according to an embodiment of the invention.

FIG. 1 illustrates a system for governed data analytic results placement, according to an embodiment of the invention. As shown in system 100, governance metadata is added to each data set being processed by one or more analytic algorithms, and the one or more analytic algorithms are deployed in a pre-determined environment based on this metadata.

More specifically, each data set A, ..., N (102-A, ..., 102-N) respectively has a corresponding set of metadata MA, ..., MN (104-A, ..., 104-N) added thereto. The term "added" as used in this illustrative context may include, but is not limited to, inserting the set of metadata into the data set to be analyzed, or keeping the sets separated and associating them in some manner (e.g., mapping, appending, etc.) with each other, i.e., MA→A, MB→B, MC→C, ..., MN→N. The one or more analytic algorithms 108 are executed in a governed deployment environment 110, examples of which will be illustrated and explained below, such that the analytic results 112 (Z) of the one or more algorithms are placed in one or more storage repositories 114 that are trusted, e.g., satisfy and/or are consistent with what the metadata of each analyzed data set specifies.

While the types of metadata that comprise 104-A, ..., 104-N can be varied, some illustrative examples will now be explained. It is to be understood, however, that other types of metadata may be obtained and/or derived to be used for making the governed placement decision with respect to the results output by the one or more analytic algorithms.

One example of metadata (104) that can be associated with a data set (102) comprises veracity scores. Examples of veracity scores are described in the U.S. patent application identified as U.S. Ser. No. 14/674,121 (Attorney Docket No. EMC-14-1126) filed on Mar. 31, 2015, and entitled "LINEAGE-BASED VERACITY FOR DATA REPOSITORIES," the disclosure of which is incorporated by reference herein in its entirety.

Figure 2:
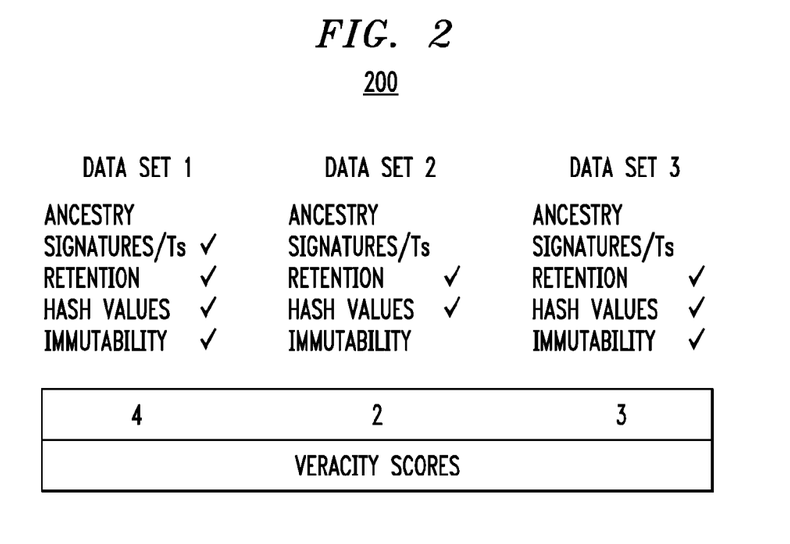
FIG. 2 illustrates veracity scores associated with data sets, according to an embodiment of the invention.

FIG. 2 illustrates the concept of veracity scores, according to an embodiment of the invention. As shown in the example of FIG. 2, five trust attributes are associated with each of three data sets: Data Set 1, Data Set 2, and Data Set 3. These data sets can be three of the data sets (102A, ..., 102-N) shown in FIG. 1. In this illustrative embodiment, these trust attributes are: (i) ancestry; (ii) signatures/timestamps; (iii) retention; (iv) hash values; and (v) immutability. As indicated, Data Set 1 has all trust attributes except ancestry (thus 4 trust attributes), Data Set 2 has only retention and hash values (thus 2 trust attributes), and Data Set 3 has retention, hash values, and immutability (thus 3 trust attributes). Assuming that the presence of each trust attribute has a value of 1, then a veracity score is computed for each data set as the addition of the values of the trust attribute present for that data set. Therefore, since Data Set 1 has 4 trust attributes, its veracity score is 4. Accordingly, Data Set 2 has a veracity score of 2, and Data Set 3 has a veracity score of 3. These veracity scores are shown in FIG. 2 and respectively represent the metadata (104-A, ..., 104-N) associated with each data set (102-A, ..., 102-N).

Alternative methods for computing the veracity scores may be implemented. By way of further example only, a customer may wish to "weight" one trust attribute more highly than another. For example, if it is determined that "immutability" is present, they may wish to double the weight of that attribute as compared to the others (e.g., assign a value of "2" as opposed to "1"). Similarly, for each trust attribute (e.g., retention), there may be different levels of retention capability possible, e.g., vanilla retention, event-based retention (events can trigger changes in retention lengths), and/or retention classes (using a variable name to keep track of retention lengths). If all three of these are present, the score for retention would be "3". If only one is present, the score would be "1". It is to be appreciated that these are non-limiting examples of how the veracity scores may be computed.

Another example of metadata (104) that can be associated with a data set (102) comprises a trust index. Examples of trust indices are described in the U.S. patent application identified as Attorney Docket No. EMC-15-1053CIP2 filed concurrently herewith and entitled "INFRASTRUCTURE TRUST INDEX," the disclosure of which is incorporated by reference herein in its entirety.

Figure 3:
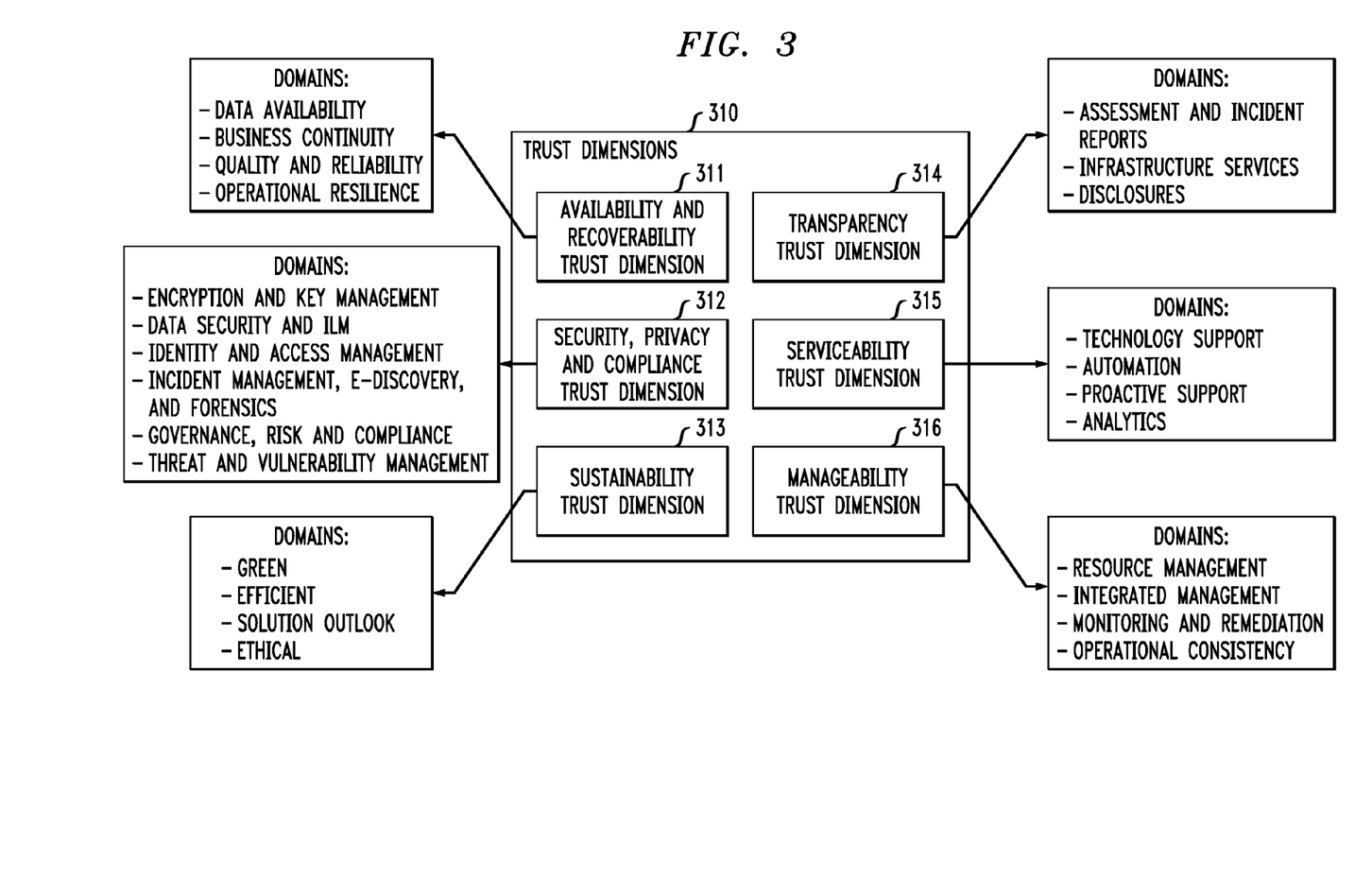
FIG. 3 illustrates a trust taxonomy associated with trusted infrastructure that stores data sets, according to an embodiment of the invention.

An infrastructure trust index for a given data set is essentially a complete summary of all of the trust capabilities of the infrastructure that currently stores (or was storing) the data set in question. FIG. 3 highlights six different trust dimensions of underlying infrastructure, and each of these six dimensions can have a large number of described capabilities. All of these capabilities can be described in a metadata structure that is attached to the input data set as an aggregate infrastructure trust index that describes the trustworthiness of the infrastructure (and thus is attributable to the data set stored thereon).

More particularly, it is assumed that a trusted infrastructure is configured to supply metadata describing its trust capabilities (characteristics). These trust capabilities, in this embodiment, comprise: (i) availability and recoverability; (ii) security, privacy and compliance; (iii) sustainability; (iv) transparency, (v) serviceability, and (vi) manageability, as will be further explained. More specifically, availability and recoverability metadata comprises statistics or other metrics that describe and/or quantify the infrastructure's ability to perform its agreed upon function(s) when required, as well as its ability to recover from failure(s). Security, privacy and compliance metadata comprises statistics or other metrics that describe and/or quantify the infrastructure's ability to ensure confidentiality, integrity and compliance of data and infrastructure. Sustainability metadata comprises statistics or other metrics that describe and/or quantify the infrastructure's ability to enable increased power and/or energy efficiencies and ensure ethical practices. Transparency metadata comprises statistics or other metrics that describe and/or quantify the infrastructure's ability to provide standardized access to customer operational reports and reporting against trust objectives. Serviceability metadata comprises statistics or other metrics that describe and/or quantify the infrastructure's ability to facilitate technical support and problem resolution. Manageability metadata comprises statistics or other metrics that describe and/or quantify the infrastructure's ability to enable automation and interoperability in managing trust-based criteria.

The metadata for such a taxonomy can be extracted from a storage infrastructure (active mode) or the infrastructure can be configured to declare these trust characteristics (passive mode).

FIG. 3 illustrates further details of the six dimension trust taxonomy mentioned above. More particularly, FIG. 3 shows trust dimensions 311 through 316 and respective domains (corresponding to the above-mentioned trust taxonomy metadata types) with which an infrastructure trust index can be computed, according to an embodiment of the invention. As shown, each trust dimension further contains domains: availability and recoverability trust dimension 311 has domains including, but not limited to, data availability, business continuity, quality and reliability, and operational resilience; security, privacy and compliance trust dimension 312 has domains including, but not limited to, encryption and key management, data security and information life-cycle management (ILM), identity and access management, incident management, e-discovery and forensics, governance, risk and compliance (GRC), and threat and vulnerability management; sustainability trust dimension 313 has domains including, but not limited to, green (environmentally-responsible), efficient, solution outlook, and ethical; transparency trust dimension 314 has domains including, but not limited to, assessment and incident reports, infrastructure services, and disclosures; serviceability trust dimension 315 has domains including, but not limited to, technology support, automation, proactive support, and analytics; and manageability trust dimension 316 has domains including, but not limited to, resource management, integrated management, monitoring and remediation, and operational consistency.

In one example, controls and values for the encryption and key management domain (part of trust dimension 312) are defined, which are used to calculate the infrastructure trust index. More specifically, assume two separate controls (control identifiers or ids) are represented, i.e., data at rest (inactive data) encryption key size (DAREKS) and network protocol traffic encryption key size (Channel KS). Each control has numeric values associated with the available characteristics of the control. For example, a 256-bit DAREKS is assigned a numeric value of 1, a 512-bit DAREKS is assigned a numeric value of 2, a 1024-bit DAREKS is assigned a numeric value of 3, and a 2048-bit DAREKS is assigned a numeric value of 4. Further, by way of example, a 112-bit Channel KS is assigned a numeric value of 1, a 128-bit Channel KS is assigned a numeric value of 2, a 192-bit Channel KS is assigned a numeric value of 3, and a 256-bit Channel KS is assigned a numeric value of 4. These numeric values, as will be explained below, are aggregated to calculate the infrastructure trust index of the subject infrastructure.

Different policies can be described on the controls to assess the index. Certain controls can be given higher weight, depending on the needs of an organization. In the above example, an organization may find data encryption at rest (DAREKS control) to be more critical and hence assign a higher weight over other controls (Channel KS). The control requirements can also be expressed by assigning appropriate weights to corresponding controls. For example, assume that the DAREKS control is given a higher weight, i.e., 10, than the Channel KS control, i.e., 1. The weights are used to formulate the index policy. Assume that user requirements for a particular infrastructure are a 256-bit DAREKS and a 112-bit Channel KS. The aggregate index score for this policy according to such user requirements and controls as defined above is computed as 10*DAREKS+1*Channel KS=10*1+1*1=11. Thus, 11 is the infrastructure trust index for the subject infrastructure.

It is to be appreciated that control, value and weight assignments are created for each trust dimension and its corresponding domains (311 through 316 in FIG. 3) such that values are assigned to the available characteristics of the controls associated with each trust dimension, and weights assigned to each control. In addition to specific trust indices for a given trust dimension or subset of domain controls, an overall infrastructure trust index can be computed that aggregates the index values computed for each trust dimension being considered.

Thus, as mentioned above, an infrastructure trust index is computed for a given data set and represents a complete summary of all of the trust capabilities (trust dimensions) of the infrastructure that currently stores (or was storing) the data set in question.

Given a set of input data sets with associated veracity metadata (e.g., veracity scores explained above in the context of FIG. 2) and/or trust metadata (e.g., infrastructure trust indices explained above in the context of FIG. 3), a governed deployment recommendation engine is provided according to illustrative embodiments that highlights the required/desired attributes necessary to store analytic output in a compliant manner. As will be explained, a governance selector input can be provided to the recommendation engine that controls the decision.

Figure 4:
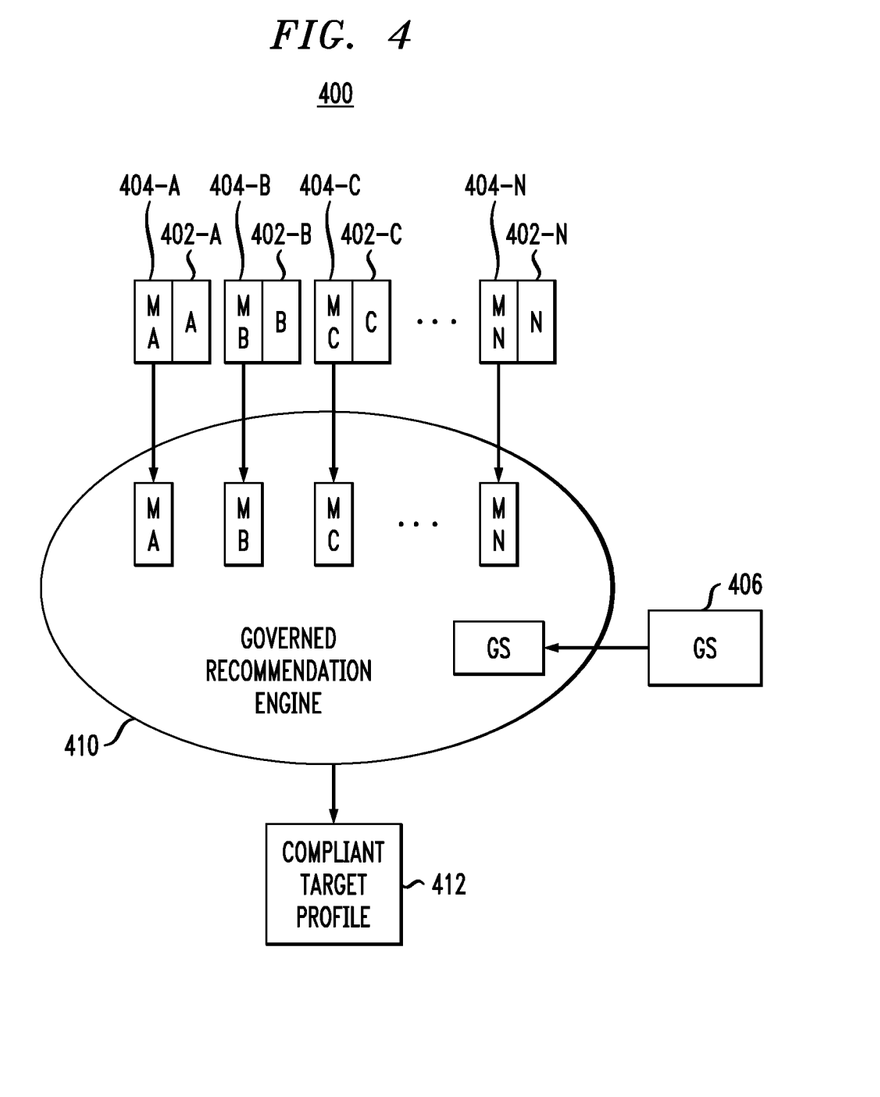
FIG. 4 illustrates a system for governed data analytic results placement with a governed recommendation engine, according to an embodiment of the invention.

FIG. 4 illustrates such a system for governed data analytic results placement with a governed recommendation engine, according to an embodiment of the invention. As shown in system 400, similar to system 100 of FIG. 1, data sets A, . . . , N (402-A, . . . , 402-N) respectively have corresponding sets of metadata MA, . . . , MN (404-A, . . . , 404-N) added thereto. Again, this governance metadata can be a variety of types but in illustrative embodiments comprises veracity scores and infrastructure trust indices as mentioned above.

The governance metadata (MA, MB, MC, . . . , MN) is gathered by a governed recommendation engine 410. In addition, the governed recommendation engine 410 receives governance selector input 406 (e.g., from a data scientist/data engineer or some other system). The governance selector input specifies a processing mode chosen from a set of predetermined governance modes, by way of example: max; average; median; mode; and override. Thus, the recommendation engine 410 uses the selector 406 to decide whether to: (a) choose the highest, most trustworthy veracity and trust index (max option); (b) average them all (average option); (c) choose the median (median option); (d) choose the mode (mode option); or (e) ignore all metadata scores and trust indices (metadata 404), and use a pre-supplied trustworthy configuration as the default (override option). In an illustrative embodiment, the override option can be a digitally signed instruction detailing what form of trusted infrastructure should be the target for analytic output.

The governed recommendation engine 410 then generates a compliant target profile 412 based on the gathered metadata (404-A, . . . , 404-N) and the governance selector option 406. This profile 412 specifies the infrastructure upon which the analytic results, obtained from executing one or more analytic algorithms (e.g., 108) on the input data sets (402-A, . . ., 402-N), are to be placed in order to satisfy the trust/veracity requirements of the gathered metadata.

Further, the profile 412 can comprise all data set input metadata, the governed selector input, and the end result (analytic output), and the profile 412 can be stored in a lineage map and preserved on a compliant, tamper-proof and delete-proof location for use in subsequent audits. This lineage data structure can also be fed in its entirety into a deployment environment as will be described below in the context of FIG. 5.

Figure 5:
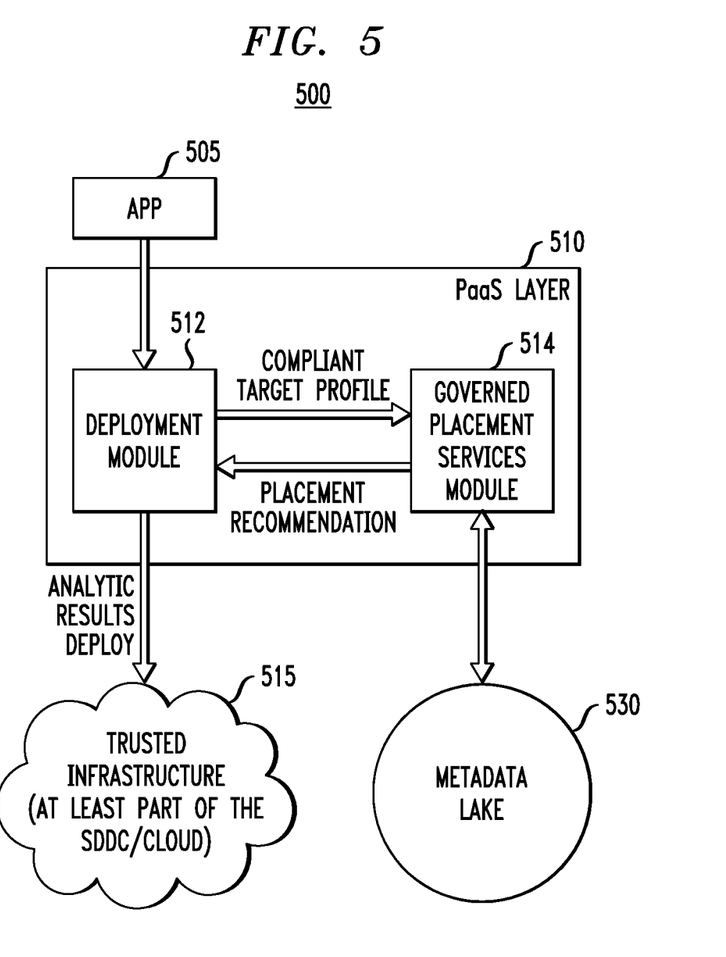
FIG. 5 illustrates analytic results placement via governed placement services, according to an embodiment of the invention.

Using the techniques described above, the compliant target profile 412 (and/or a lineage map associated with the compliant target profile) can be fed, along with the one or more analytic applications (algorithms) that generated the results, and the data sets, into a governed placement environment 500 as shown in FIG. 5. U.S. patent application identified as Ser. No. 14/610,191 filed on Jan. 30, 2015 and entitled "GOVERNED APPLICATION DEPLOYMENT ON TRUSTED INFRASTRUCTURE," the disclosure of which is incorporated by reference herein in its entirety, describes a governed application deployment environment. FIG. 5 adapts such an environment for placement (deployment) of analytic results using the compliant target profile generated according to illustrative embodiments described above.

More specifically, the analytic application (algorithm) 505 that generated the subject analytic results is passed to a deployment module 512 of a PaaS layer 510 (e.g., Cloud-Foundry) along with the compliant target profile. This profile is passed to a governed placement services module 514, which fetches all of the trust profiles of any underlying cloud infrastructures from a metadata lake 530, and then performs a best-fit match of the compliant target profile to the infrastructures. If one cannot be found, then the governed placement services module 514 has the option to reject the placement. If one is found, then this target infrastructure is passed back to the deployment logic of module 512, which proceeds to deploy the application and analytic results to the target infrastructure, e.g., trusted infrastructure 515 which may include some portion or all infrastructure of a software defined data center (SDDC) or cloud of a cloud infrastructure.

Information describing the entire governed placement process described above in FIG. 5 can be captured in an immutable, non-deleteable lineage chain for preservation in support of future audits.

Figure 6:
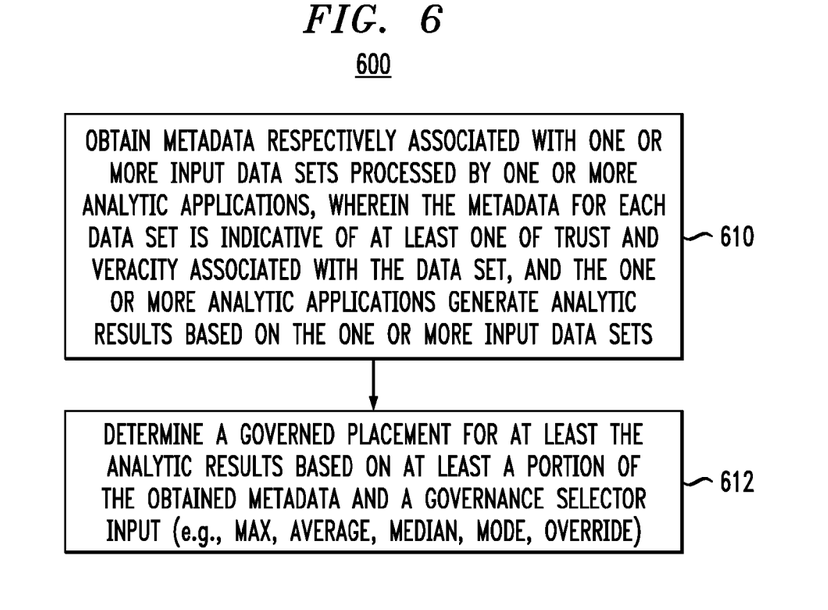
FIG. 6 illustrates a methodology for governed placement of analytic results, according to an embodiment of the invention.

FIG. 6 illustrates a methodology for governed placement of analytic results, according to an embodiment of the invention.

As shown in methodology 600, step 610 obtains metadata respectively associated with one or more input data sets processed by one or more analytic applications. The metadata for each data set is indicative of at least one of trust and veracity associated with the data set. The one or more analytic applications generate analytic results based on the one or more input data sets.

Step 612 determines a governed placement for at least the analytic results based on at least a portion of the obtained metadata and a governance selector input (e.g., max, average, median, mode, override modes).

Given the teachings herein, a wide variety of use cases could implement the governed analytic results placement methodologies and systems described herein. A few non-limiting examples are as follows.

Assume that a large financial services data provider P is hired by a large institutional customer C located in a different jurisdiction where customer data protection laws are stringent. C would like P to execute complex analytics involving a number of data sources including open data, customer data, market data and proprietary information. They want assurances that the staff and data scientists involved in this effort will have no direct access to all the data itself. Furthermore, they are asking that the aggregated data and other intermediary results need to be stored securely and their access governed by strict policies (provided). Another requirement is the need to include data from two other jurisdictions. The final analytics result (deliverables) need to be stored back at the original location.

This is a somewhat complex scenario where the above described governed analytic results placement techniques will prove helpful. However, it is a typical scenario that is not handled appropriately with current technologies as we often discover particularly in financial services with stress tests and compliance failures, data protection challenges, and supervision limitations. The idea that a data governance system will interact with the analytics engine and in real-time derive the most suitable options and configuration based on provided and discovered criteria and profiles, in accordance with embodiment of the invention, is important at a number of levels: (a) helps the chief data officer in his or her governance job; (b) supports customers with compliance and risk management; and (c) facilitates audit and supervision.

This second use case describes a healthcare scenario. Assume that healthcare data provider Alpha is used to capture health monitoring data, integrate it with open data and other clinical data as well as aggregated data from multiple patients. The output is then provided to a number of customers located in different jurisdictions. These customers are not authorized to access the raw customer data but can reuse the aggregated information for their own purposes as long as the output is stored appropriately in accordance with policies and regulatory requirements. The reused aggregated analytics data cannot be transported to local jurisdictions. Like the first use case, it is to be appreciated that the governed analytic results placement systems and methodologies described herein can be applied to advantageously address this healthcare scenario.

Figure 7:
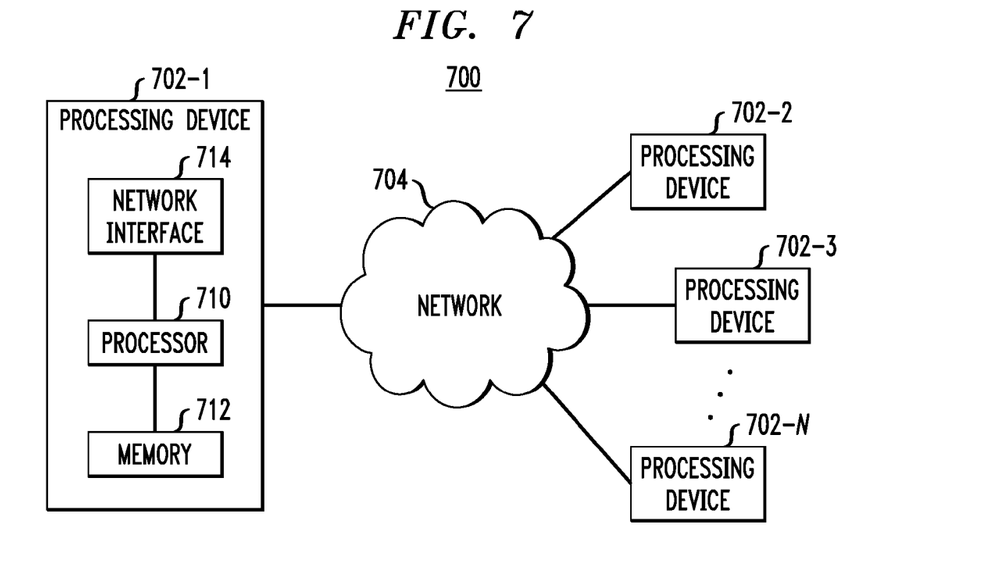
FIG. 7 illustrates a processing platform used to implement a system for governed data analytic results placement, according to an embodiment of the invention.

As an example of a processing platform on which a system for governed data analytic results placement (e.g., systems shown in FIGS. 1, 4 and 5) can be implemented is processing platform 700 shown in FIG. 7. The processing platform 700 in this embodiment comprises a plurality of processing devices, denoted 702-1, 702-2, 702-3, . . . 702-N, which communicate with one another over a network 704. It is to be appreciated that the governed analytic results placement methodologies described herein may be executed in one such processing device 702, or executed in a distributed manner across two or more such processing devices 702. The cloud infrastructure environment may also be executed in a distributed manner across two or more such processing devices 702. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system environments respectively shown as FIGS. 1, 4 and 5 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 700 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the system environments described herein may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    obtaining metadata respectively associated with one or more input data sets processed by one or more analytic applications, wherein the metadata for a given input data set is indicative of at least one of trust and veracity associated with the given input data set, and the one or more analytic applications generate analytic results based on the one or more input data sets;
    obtaining a governance selector input, wherein the governance selector input specifies a mode of processing the obtained metadata; and
    determining a governed placement for at least the analytic results based on at least a portion of the obtained metadata and at least in part on the specified mode of processing the obtained metadata;
    wherein the obtaining and determining steps are executed by one or more processing devices, each of the one or more processing devices comprising a processor operatively coupled to a memory.

2. The method of claim 1, wherein the specified mode of processing the obtained metadata comprises choosing the metadata with the highest level of veracity or trust to make the placement determination.

3. The method of claim 1, wherein the specified mode of processing the obtained metadata comprises averaging the metadata of the one or more input data sets to make the placement determination.

4. The method of claim 1, wherein the specified mode of processing the obtained metadata comprises calculating the median of the metadata of the one or more input data sets to make the placement determination.

5. The method of claim1, wherein the specified mode of processing the obtained metadata comprises calculating the mode of the metadata of the one or more input data sets to make the placement determination.

6. The method of claim 1, wherein the specified mode of processing the obtained metadata comprises overriding the metadata of the one or more input data sets to make a default placement determination.

7. The method of claim 6, wherein the default placement determination is specified by a digitally signed instruction defining the form of trusted infrastructure for placement of the analytic results.

8. The method of claim 1, wherein determining the governed placement further comprises generating a compliant target profile that specifies at least one of veracity and trust criteria for an infrastructure upon which to store the analytic results that complies with at least a portion of the obtained metadata.

9. The method of claim 8, wherein the compliant target profile is securely stored for use in a subsequent audit.

10. A system comprising:
    one or more processors operatively coupled to one or more memories and configured to:
    obtain metadata respectively associated with one or more input data sets processed by one or more analytic applications, wherein the metadata for a given input data set is indicative of at least one of trust and veracity associated with the given input data set, and the one or more analytic applications generate analytic results based on the one or more input data sets;
    obtain a governance selector input, wherein the governance selector input specifies a mode of processing the obtained metadata; and
    determine a governed placement for at least the analytic results based on at least a portion of the obtained metadata and at least in part on the specified mode of processing the obtained metadata.

11. The system of claim 10, wherein the specified mode of processing the obtained metadata comprises one of:
    choosing the metadata with the highest level of veracity or trust to make the placement determination;
    averaging the metadata of the one or more input data sets to make the placement determination;
    calculating the median of the metadata of the one or more input data sets to make the placement determination; and
    calculating the mode of the metadata of the one or more input data sets to make the placement determination.

12. The system of claim 10, wherein the specified mode of processing the obtained metadata comprises overriding the metadata of the one or more input data sets to make a default placement determination.

13. The system of claim 12, wherein the default placement determination is specified by a digitally signed instruction defining the form of trusted infrastructure for placement of the analytic results.

14. The system of claim 10, wherein the determination of the governed placement further comprises a generation of a compliant target profile that specifies at least one of veracity and trust criteria for an infrastructure upon which to store the analytic results that complies with at least a portion of the obtained metadata.

15. The system of claim 14, wherein the compliant target profile is securely stored for use in a subsequent audit.

16. An article of manufacture comprising a processor-readable storage medium having encoded therein executable code of one or more software programs, wherein the one or more software programs when executed by one or more processing devices implement steps of:

obtaining metadata respectively associated with one or more input data sets processed by one or more analytic applications, wherein the metadata for a given input data set is indicative of at least one of trust and veracity associated with the given input data set, and the one or more analytic applications generate analytic results based on the one or more input data sets;

obtaining a governance selector input, wherein the governance selector input specifies a mode of processing the obtained; and determining a governed placement for at least the analytic results based on at least a portion of the obtained metadata and at least in part on the specified mode of processing the obtained metadata.

17. The article of claim 16, wherein the specified mode of processing the obtained metadata comprises one of:

choosing the metadata with the highest level of veracity or trust;

averaging the metadata of the one or more input data sets;

calculating the median of the metadata of the one or more input data sets; and calculating the mode of the metadata of the one or more input data sets.

18. The article of claim 16, wherein the specified mode of processing the obtained metadata comprises overriding the metadata of the one or more input data sets to make a default placement determination.

19. The article of claim 18, wherein the default placement determination is specified by a digitally signed instruction defining the form of trusted infrastructure for placement of the analytic results.

20. The article of claim 16, wherein determining the governed placement further comprises generating a compliant target profile that specifies at least one of veracity and trust criteria for an infrastructure upon which to store the analytic results that complies with at least a portion of the obtained metadata.

* * * * *